United States Patent

[11] 3,590,664

| | | |
|---|---|---|
| [72] | Inventor | Sulo A. Aijala<br>Attleboro, Mass. |
| [21] | Appl. No. | 881,010 |
| [22] | Filed | Dec. 1, 1969 |
| [45] | Patented | July 6, 1971 |
| [73] | Assignee | Intricate Machine & Engineering Inc. |

[54] MEANS FOR MOUNTING A HAND SAW IN A RETOOTHING OR SHARPENING MACHINE
4 Claims, 5 Drawing Figs.

[52] U.S. Cl. .................................................. 76/43,
76/76, 76/78, 269/95, 269/100
[51] Int. Cl. ........................................................ B23d 63/12
[50] Field of Search........................................... 76/43, 76,
42, 37; 269/95, 100; 76/78, 75

[56] References Cited
UNITED STATES PATENTS

| 1,491,706 | 4/1924 | Klin .............................. | 76/78 UX |
| 1,634,834 | 7/1927 | Johnson ....................... | 76/78 UX |

*Primary Examiner*—Bernard Stickney
*Attorney*—Barlow and Barlow

ABSTRACT: The saw-feeding means in a retoothing or sharpening machine is provided in two parts, one of which may be removed from the machine to have the saw clamped thereto. This removable part may then be assembled with the fixed part in the machine by a resilient clamping arrangement with an adjustment for positioning the saw as desired in the machine.

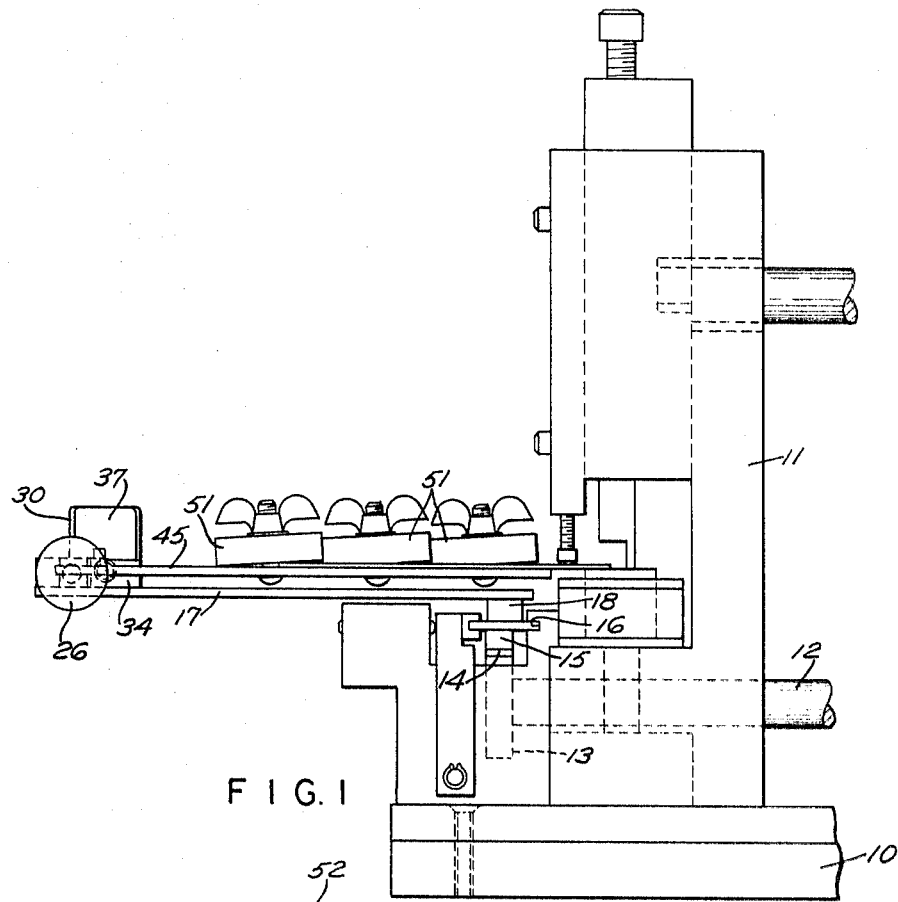
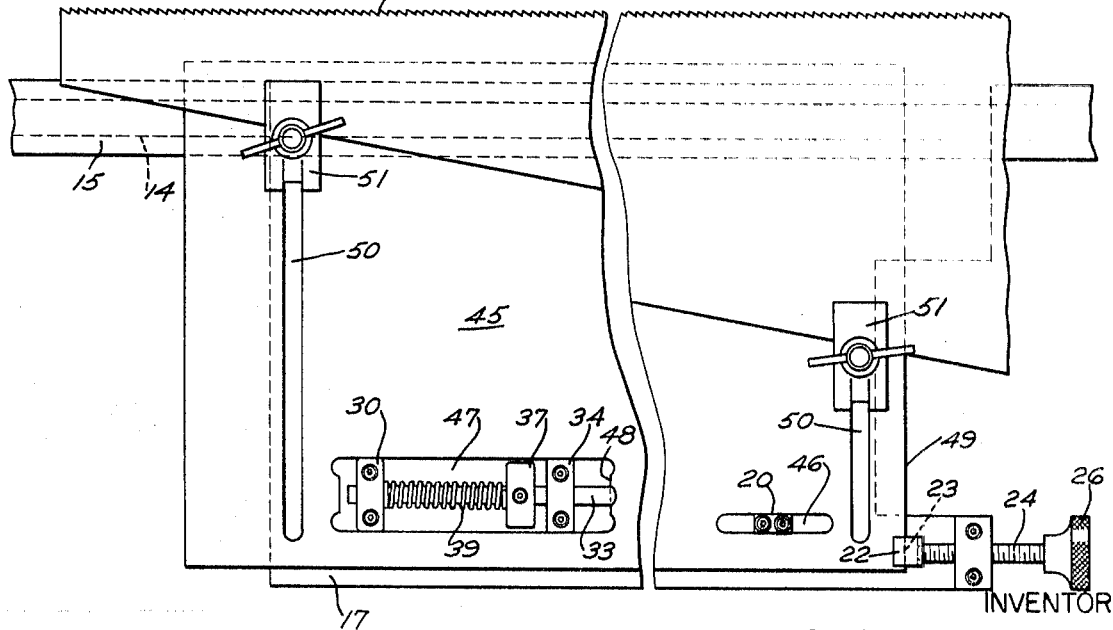

PATENTED JUL 6 1971

INVENTOR
SULO A. AIJALA
BY
*Barlow & Barlow*
ATTORNEYS

MEANS FOR MOUNTING A HAND SAW IN A RETOOTHING OR SHARPENING MACHINE

RELATED APPLICATIONS

The device which is the subject of this invention is a feed mechanism which may be utilized in connection with my Saw Tooth Cutting Machine, Ser. No. 761,498 filed Sept. 23, 1968 U.S. Pat. No. 3,546,975, or my Saw Tooth Setting Machine, Ser. No. 761,500, filed Sept. 23, 1968.

BACKGROUND OF THE INVENTION

In either of the two above-mentioned applications for operating upon a hand saw, the feeding mechanism comprises a rotating gear which engages a rack with teeth thereon which rack is removed from the machine in order that the saw may be mounted or assembled with it and then is returned to the machine. This is a cumbersome and awkward operation to perform.

SUMMARY OF THE INVENTION

The feeding means for the saw comprises two members, one being a carriage member mounted upon the rack bar that feeds the saw through the machine and the other being a saw holder member which may be detached from the carriage member to have the saw mounted thereon and then reassembled with the carriage member for feeding the saw through the machine. Alignment means are provided between the saw holder member and the carriage member so that the holder member will be accurately positioned on the carriage and adjustment means are also provided so that the saw may be suitably related to the tool which is to operate upon the teeth of the saw.

DESCRIPTION OF THE DRAWINGS

FIG. 1 is an elevation of a part of the machine represented in my copending application, Ser. No. 761,500, with the improved saw-feeding mechanism in position thereon;

FIG. 2 is a detached top plan view of the saw-feeding mechanism of this invention on a much larger scale than shown in FIG. 1, illustrating the saw in position;

DESCRIPTION OF THE PREFERRED EMBODIMENT

Figure 3:
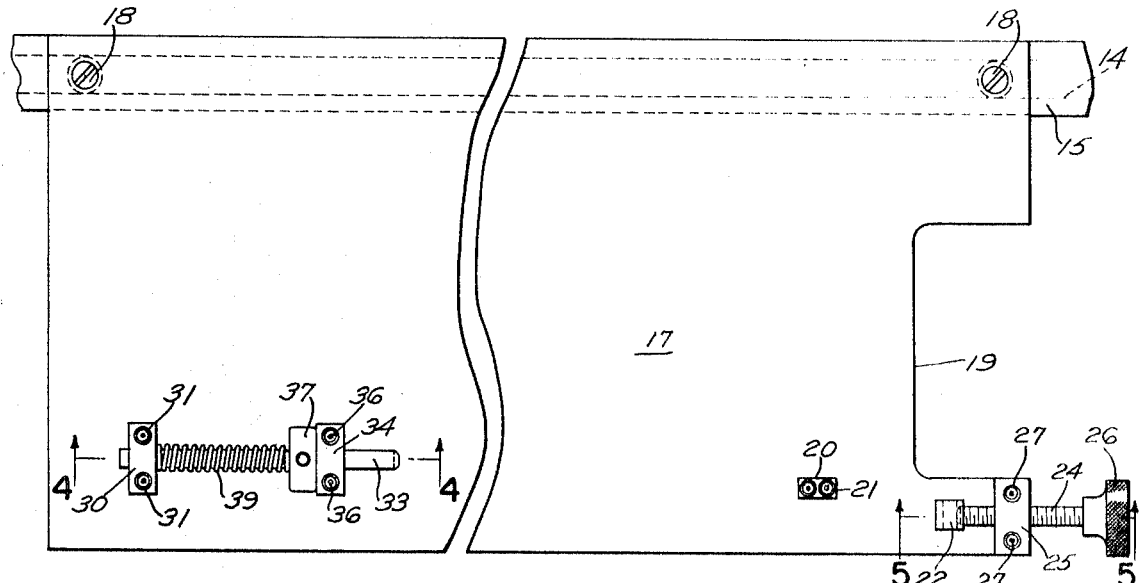
FIG. 3 is a top plan view of the saw carriage and portion of the rack bar.
Figure 5:
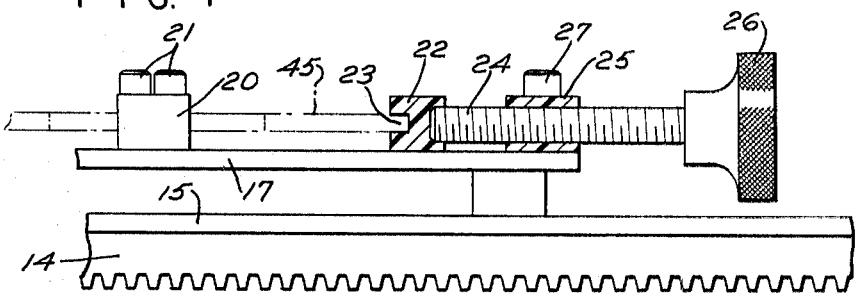
FIG. 5 is a sectional view on substantially line 5—5 of FIG. 3.

In FIG. 1 there is illustrated a portion of a machine shown more completely in my application, Ser. No. 761,500, in which there is a base 10 and upright support 11. The feed drive shaft 12 has a gear 13 on its end which engages a toothed rack 14 on a rack bar 15 which slides in the grooves 16 and has mounted thereon a carriage member 17 by means of spacing posts 18 between the rack bar 15 and carriage member 17. This carriage is in the form of a plate (see FIG. 3) which is notched at one end as at 19 to accommodate certain upright portions of the machine. A projection 20 extends upwardly from this plate 17 (see also FIG. 5) with a pair of pins 21 extending therefrom. This is fixed on the plate by any suitable means such as by being engaged by screws extending through the plate from the bottom thereof. An abutment 22 formed of nylon is notched as at 23 and is carried by a screw-threaded shaft 24 threaded through the bearing 25 and operated by knurled handle 26. This bearing 25 is secured in fixed position on the carriage 17 by screws 27.

Figure 4:
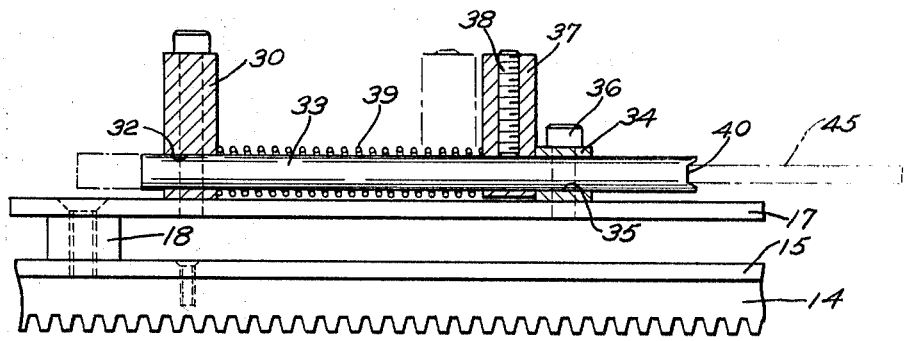
FIG. 4 is a sectional view through the alignment and locking means on substantially line 4—4 of FIG. 3.

Near the other end of the carriage 17 there is a guide post 30 (see FIG. 3) held in position on the plate 17 by screws 31 that has a bearing 32 for a rod 33 to slide therethrough. This rod is similarly slidably mounted in a second post 34 of shorter extent, being slidable in a bearing 35 therein, which post 34 is secured in place by screws 36 threaded into the carriage 17. A rod-operating handle 37 is secured in a certain adjusted position on the rod 33 by a screw 38 threaded through the handle 37 and engaging the rod 33; thus, this handle may be used to move the rod as it is slid axially through its bearings 32 and 35. A spring 39 urges this handle 37 and rod 33 to the right as shown in FIG. 4 by abutting post 30 at one end and abutting the handle 37 at the other end. However, the rod may be slid to the left as shown in dotted lines in FIG. 4 by using the handle 37 to move the rod through its bearings toward the post 30. The rod is notched as at 40 to engage the saw-holding member 45 to urge it against abutments 22.

The saw-holding member 45 is essentially a plate seen as mounted on the carriage member 17 and in plan view in FIG. 2. This member is slotted as at 46 of a width to slidably engage and be guided by the upstanding projection 20 on the carriage 17. Likewise, there is provided a slot 47 in this saw-holding member 45 which is of a width to receive and be guided by the posts 30 and 34 which extend upwardly from the carriage 17. Thus, when the holder member 45 is positioned on the carriage member, it is guided at two points by close-fitting engagement of the post 20 with the edges of the slots 46 and close fitting engagement of the posts 30 and 34 with the edges of slot 47. The edges of the slots 46 and 47 are in parallel arrangement and the saw holder member may slide or move with reference to the carriage longitudinally of these two slots which guide it. In positioning the saw holder member on the carriage, the rod 33 is moved to the left by the handle member 37 against the action of a spring 39 and the saw-holding plate 45 positioned in the position shown in FIG. 2 with its slots over the guiding projections on the carriage, after which the handle 37 is released to allow the slot 40 in the end of the rod 33 to engage the edge 48 of the slot 47 of the saw holder plate 45 and thus move the saw holder 45 so that the edge 49 of the saw holder member in the notch 23 of the nylon abutment 22 is retained firmly in position on the carriage.

Slots 50 are provided in the saw-holding member 45 with clamps 51 engaging the back of the saw and pressing the saw against the saw holder after the saw is in a position so that the teeth 52 of the hand saw are parallel to the edge of the saw holder 45. An instrument to provide alignment of the saw holder and the saw is more completely described in my copending application, Ser. No. 881,011, filed of even date herewith. Adjustment of the saw and its holder may be had by the manipulation of the handle 26 and the threaded member 24 heretofore described.

When the saw holder is mounted on its carriage in the machine as shown in FIG. 1, the handle 26 is readily accessible to the operator so that he may move the saw relative to the carriage sufficiently to cause the teeth 52 to be in the alignment desired for the operation to be performed.

I claim:

1. In a machine for operating upon a saw having a saw-feeding means, said feeding means comprising a saw carriage member movable with said feeding means and a saw holder member detachable from said carriage member, interconnecting means between said carriage member and holder member comprising interfitting parts, one part secured on the carriage member and the other part secured on the holder member.

2. In a machine as in claim 1 wherein said interfitting parts are relatively movable in one straight line direction with an abutment on one member and yielding means urging the other member toward said abutment.

3. In a machine as in claim 2 wherein said yielding means may be operated to remove the holder member from the carriage member.

4. In a machine as in claim 2 wherein said abutment is adjustable to move said holder member relative to said carriage member.